Figure 1:
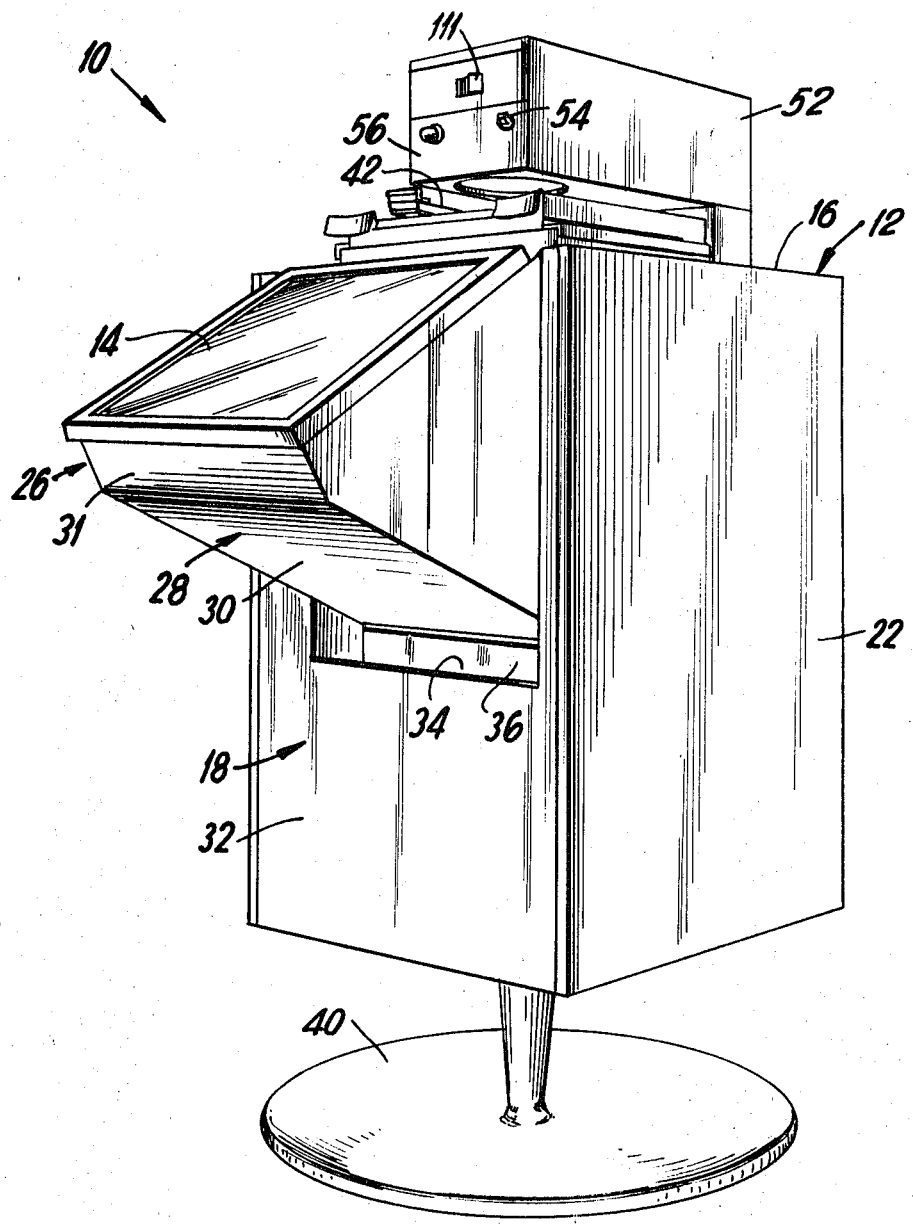

United States Patent

[11] 3,601,486

[72] Inventor Mark Levine
 Plainview, N.Y.
[21] Appl. No. 38,207
[22] Filed May 18, 1970
[45] Patented Aug. 24, 1971
[73] Assignee Readex Microprint Corporation
 New York, N.Y.

[54] COMBINATION READER-PRINTER
 5 Claims, 2 Drawing Figs.

[52] U.S. Cl. .................................................. 355/45,
 353/64
[51] Int. Cl. ............................................. G03b 13/28
[50] Field of Search .......................................... 353/63, 64;
 355/18, 45

[56] References Cited
UNITED STATES PATENTS

| | | | |
|---|---|---|---|
| 2,211,376 | 8/1940 | Isbell | 353/63 |
| 3,225,648 | 12/1965 | Toler | 353/64 |
| 3,263,557 | 8/1966 | Cunningham et al. | 355/45 |
| 3,282,153 | 11/1966 | Chen et al. | 355/45 |
| 3,305,459 | 2/1967 | Smith et al. | 355/45 |

Primary Examiner—Samuel S. Matthews
Assistant Examiner—E. M. Bero
Attorney—Davis, Hoxie, Faithfull and Hapgood ABSTRACT: A compact epidiascopic combination reader-printer is disclosed which projects enlarged images of microforms for viewing or printing by persons of widely ranging heights seated in front of the reader-printer. The reader-printer housing includes a cantilevered portion projecting forwardly supporting a rear projection viewing screen. The housing has an upper surface on which is mounted a microform holder and transport means, and means for transmitting light through transparent microforms. Lighting means are also mounted below the microform holder to illuminate opaque microforms. A printing station is mounted within the housing and adjacent the rear wall of the housing and an optical system within the housing provides an enlarged image. A system including movable and stationary mirrors transmits an enlarged image to either the printing station or the viewing screen. The housing shape and location of the various elements which necessarily are manipulated or observed by a user are such as to provide comfortable use by persons of widely ranging heights seated in front of the reader-printer.

INVENTOR.
MARK LEVINE

COMBINATION READER-PRINTER

This invention relates to devices for enlarging and projecting microform images for reading and printing purposes.

In view of the wide use being made of microforms, a need exists for devices capable of enlarging and printing microforms to provide an enlarged copy which is readable without further enlargement. It is also desirable that the same device include a viewing capability such that the user can read the microforms and select visually the particular portion of a microform that he desires to print. Because microforms are available on opaque and transparent media, the device also should have the epidiascopic capability of being able to project and print both types of media without modification.

Since these devices will be used in a variety of locations such as schools, libraries, industrial establishments, hospitals, etc., it is desirable that the devices be simple in operation, compact in order to conserve space, and designed such that they may be comfortably used in a seated position by different persons of widely ranging heights.

Briefly stated the present invention, in one form, comprises basically an enlarging projector printer and reader employing a conventional electrostatic or photographic printing process. A reflector, or any other odd number of reflectors necessary for providing a properly oriented image at the printing station, is used to direct the projected image to the photosensitive copy medium. The lens and optical path length are chosen to provide a predetermined magnification. Lenses of different focal length can be turret mounted or a zoom lens employed to provide alternate desired magnifications. The printing station is located adjacent to the rear wall of the device and the developing of the exposed copy medium is performed by means located interior of the housing near the front wall with the developed print being transported to a print delivery receptacle which is accessible from the front wall.

The housing for the device is designed to conserve space and to be comfortably used by persons of various heights comfortably seated in front of the device. To accomplish this, the front wall of the housing is provided with a viewing screen and support therefore depending downwardly from the device's upper surface at an angle of approximately 30°. The support has an under surface configured to accommodate the knee and leg portions of a person seated in front of the device on a chair of conventional height. Access to the developed print delivery receptacle is located immediately below the screen and screen support. Thusly located, the viewing screen is in a position which readers normally employ when reading books and other printed matter. Microform readers having generally vertical or generally horizontal screens are tiring to use because of the unnatural reading positions which the reader must use. Readers who wear glasses, particularly bifocals, find such vertical screen readers most unsatisfactory because they must hold their heads back in an uncomfortable attitude.

A microform holder and transport means is mounted on the upper surface of the housing adjacent to the front surface of the housing and at a height above the floor in the accepted range of heights for comfortable arm movement by persons seated in front of the device. The microform holder and transport means is designed to move the microform back or forth and in or out while maintaining it in the plane of focus thereby eliminating the need for refocusing the device each time a microform is relocated with respect to the optical system.

Separate light sources provide the capability of printing and viewing both opaque and transparent microforms while employing a single optical system. For projecting opaque microforms, one or more projection lamps are located on the same side of the microform as is the lens and the lamps are directed upwardly at the microform. In order to project a transparent microform, a different light source is employed which is located above the microform on the side opposite the lens such that the light is transmitted through the transparency. The light sources are chosen to provide equally effective light intensity at the printing station so that no aperture or exposure time adjustments need be made in the printing and developing process to accommodate opaque and transparent microforms.

Figure 2:
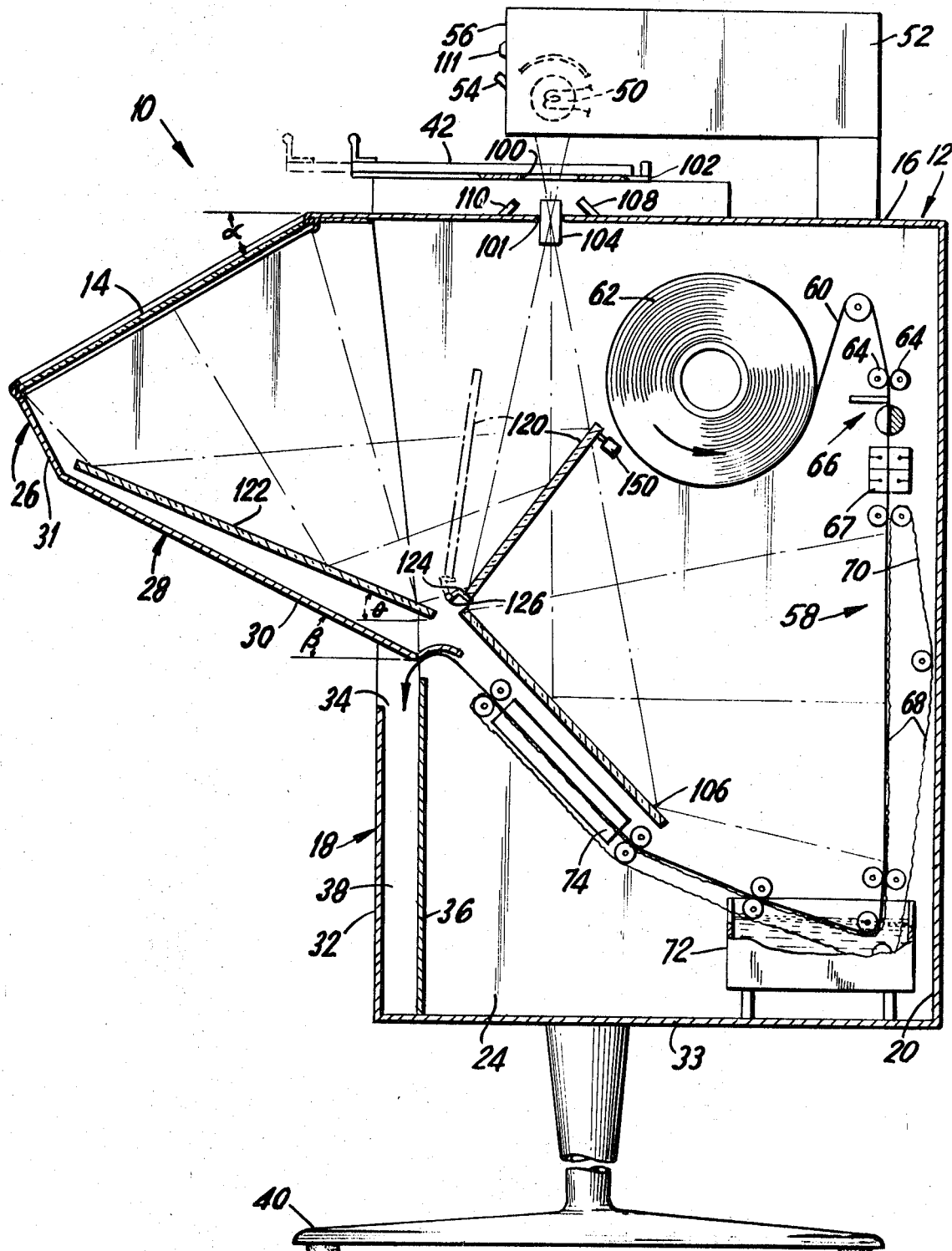

These and other features and advantages of the subject invention will become readily apparent to those skilled in the art from the following detailed description in combination with the drawings in which like characters denote like parts and wherein:

FIG. 1 is a perspective view of a reader-printer formed in accordance with this invention; and FIG. 2 is a schematic sectional view of the reader-printer of FIG. 1.

With reference to the drawings, there is illustrated a combination device 10 for enlarging and projecting microform images for reading and printing. Throughout this description, the device will be referred to as a reader-printer. The reader-printer 10 is used to permit reading of enlarged portions microform images stored on either opaque or transparent microforms. The reader-printer 10 also enables the user to produce a print of a desired enlarged portion of the microform. The reader-printer housing 12 is designed to conserve space while at the same time enabling different persons of widely different heights to be able to comfortably read the projected image on a viewing screen 14 and operate the reader-printer while seated.

The housing is formed with an upper surface 16, a front surface 18, a rear surface 20 and opposing side surfaces 22, 24. The rear surface 20 and side surfaces 22, 24 are vertical and flat so that the reader-printer 10 may be placed flush against a wall or in a corner. All manipulative operational features and controls are freely accessible from either the upper surface 16 or a forwardly facing surface while the user is seated to maximize the various locations in which the reader-printer can be located. The front surface 18 is formed with an upper forwardly projecting or cantilevered portion 26 which extends forwardly and downwardly from the upper surface 16 at a preferred angle $\alpha$ to a horizontal plane of approximately 30°, although the angle may be within the range of 25° to 35°. A conventional translucent, rear projection viewing screen 14 is mounted on the cantilevered portion 26. The lower surface 28 of the cantilevered portion is configured to accommodate comfortably the knee and leg portions of a person seated in front of the reader-printer 10 on a chair of standard height. Such a configuration utilizes a wall 30 forming an angle $\beta$ of approximately 25° to the horizontal. In order to reduce the length of the cantilevered portion 26, the wall 30 ends with a portion 31 thereof forming a 90° angle with the viewing screen 14. It has been determined that the viewing screen 14 oriented at a 30° angle below the horizontal and having a midpoint approximately 30—36 inches, and preferably 33 inches high is optimal for comfortable viewing by both adults and older children. Below the cantilevered portion 26 is a vertical wall 32 having an opening 34 therethrough. Spaced from the inner surface of the wall 32 is a second wall 36 which, together with the front wall 32 and a bottom wall 33 forms a receptacle 38 for delivery of enlarged prints of the microform, the prints being transported to the receptacle 38 in a manner described below. The distance between the forwardmost portion of the cantilevered portion 26 and the vertical wall 32 is approximately 12 inches so as not to interfere with the legs of a person seated at the reader-printer 10. The front, side and rear walls can extend down to the floor or, alternatively, the reader-printer can rest on legs or preferably on a pedestal 40, as is illustrated.

Mounted on the upper surface 16 immediately adjacent to the cantilevered portion 26, is a microform holder and transport means 42. While various conventional holder and transport means may be utilized, a preferred mechanism is one which permits the operator to move the microform in mutually perpendicular directions within a single plane in order to eliminate the need to refocus the lens. Movement of the microform is necessary in order to position the desired portion of the microform so that it may be viewed on the screen 14 or projected to the printing station which is described below. A preferred microform holder and transport means is described in U.S. Pat. No. 3,463,585 assigned to the Readex Microprint Corporation, New York, N.Y. By locating the holder and transport means 42 on the upper surface 16 and within the range of 32—40 inches above the floor, preferably 36 inches, it may be easily reached by persons seated in front of the reader-printer. The horizontal distance between the forward extremity of the cantilevered portion 26 and the transport mechanism 42 is less than 24 inches and preferably is approximately 12 inches to be within the accepted range of comfortable arm reach and manipulative movement for seated persons.

Mounted within and adjacent to the rear wall 20 of the housing 12 is a printing station 58 to which the image desired to be printed is projected. The printing station 58 may utilize any of several conventional reproduction processes of the type incorporated in office machine reproduction equipment. A preferred process is an electrostatic process which is well known and the following brief description is based upon that process. A continuous sheet of copy paper 60 is drawn from a roll 62 and is passed over rollers 64 and through a paper cutting means 66 which cuts the paper to a desired length. The cut sheet of paper then passes through an electrostatic sensitizer 67 which renders the copy paper 60 photosensitive. The paper is transported through the remainder of the system on a perforated belt 68 which is exposed to a reduced pressure source 70 to cause the paper to temporarily adhere to the belt 68. The belt delivers the sensitized paper to the printing station 58 wherein it halts and is exposed to the projected image desired to be printed. The paper then resumes its progress and passes through a developing station 72, a heater 74 which dries the paper, and then into the finished print delivery receptacle 38.

The printing station 58 is located immediately adjacent the rear wall 20 of the housing 12 and the developing station 72 and drying station 74 occupy the distance between the rear wall 20 and the front wall 18 of the housing 12 in order to provide sufficient distance during which the developing and drying processes may take place so that the fully developed and dried print can be delivered to receptacle 38 on the front wall 32 of the housing. This arrangement efficiently utilizes the available space within the housing 12 to accomplish the desire of providing a compact reader-printer 10.

To project an enlarged image from a microform to the printing station 58 an aperture 100 is provided through a horizontal platen 102 which is mounted on the upper surface 16 of the housing 12. A holder and transport means is mounted on the platen 102 so the platen can be considered part thereof. A second aperture 101, aligned with the first aperture 100 extends through the upper surface 16 of the housing. The transparent microform (not shown) in the holder and transport means 42 is maneuvered until the desired portion of the microform resides immediately above the aperture 100. Below the aperture 100 and in optical alignment therewith is a conventional projecting lens 104 which can be mounted in the aperture 101. A stationary reflecting surface 106, such as a mirror, is mounted directly below the lens 104 and is disposed at an appropriate angle to direct the image to the printing station 58. Since the printing station is vertically oriented adjacent to the rear wall 20 and the microform is supported horizontally, the mirror 106 is oriented at a 45° angle to the horizontal. Only a single reflecting surface 106 is utilized to project the image to the printing station 58 because an odd number of reflecting surfaces must be employed to provide a nonreverse image on the copy paper because the lens 104 inverts the original image from the microform and it is necessary to provide a second inversion in order that the printed image be properly oriented.

In order to project transparent microforms, a lamp 50 is mounted within a lamp housing 52 which in turn is a hollow arm mounted on the upper surface 16 of the reader-printer housing 12. The lamp housing 52 extends over the holder and transport means 42 and an illumination mode selector switch 54 mounted on the front panel 56 thereof, within easy reach of a person seated in front of the reader-printer 10. The transparency projection lamp 50 provides illumination immediately above the aperture 100.

If an opaque microform is the subject to be viewed or printed, it is necessary to illuminate the undersurface of the microform. At least one lamp, and preferably two lamps, 108, 110 are mounted beneath the microform holder 42. The lamps are aligned in such a manner as to illuminate the microform without reflection. Mode selector switch 54 is positioned to select the appropriate mode of illumination. The mode switch 54 for selecting between the illumination modes and the machine power switch 111 are located on the front panel 56 of the transparency lamp housing 52 so as to be conveniently and comfortably accessible to a user seated in front of the reader-printer 10.

In order to project the microform image onto the viewing screen 14, a secondary image path is employed. The secondary image path illustrated is designed to provide an image on the viewing screen enlarged to the same size as the image projected onto the printing station 58. Since the desired projection onto the viewing screen is the same magnification as that on the printing station 58, the viewing optical path is designed to be identical in length to the printing optical path. Because the viewing screen is a rear projection screen, it is necessary that an even number of reflecting surfaces 120, 122 be utilized in order that the viewer sees a properly oriented image. The image from the microform is projected onto a movable reflecting surface or mirror 120 and then to a stationary reflecting surface or mirror 122 from which it is projected onto the rear surface of the translucent viewing screen 14. The stationary reflecting surface 122 is mounted within the cantilevered portion 26 of the housing and the movable reflecting surface 120 is mounted so that when it is in its operational position for transmitting the image to the viewing screen 14, it prevents the light from being transmitted to the reflecting surface 106 and thence to the printing station 58. In order to accomplish this, the mirror 120 is mounted so that when moved into the viewing screen position as illustrated in FIG. 2 it resides between the lens 104 and the reflecting surface 106. The orientation of the movable mirror 120 when in the viewing screen position and the stationary mirror 122 is chosen to conserve space within the housing and, at the same time, provide the desired optical path of desired length and shape. This is accomplished by orienting the stationary mirror 122 at an angle $\theta$ of approximately 23° to the horizontal and mounting it adjacent to the lower surface 28 of the cantilevered portion 26. The movable mirror 120, is normally positioned in its operational position shown by the solid lines in FIG. 2. When in that position it is oriented at an angle of approximately 53° to the horizontal. The movable mirror 120 is mounted on a bracket 124 which in turn is supported on a rotatable shaft 126 having its axis of rotation offset from the lowest point of the mirror 120 in order that the lowest point of the mirror 120 be moved out of the optical path from the microform to the reflecting surface 102 as is illustrated by the phantom lines in FIG. 2. In this position mirror 120 blocks ambient light entering through the viewing screen 14 from striking the light sensitive copy paper 60. Rotatable shaft 126 can be connected to a manually operable lever (not shown) or can be driven by a motor (not shown) immediately prior to a print cycle. An interlock switch 150 is activated by mirror 120 when in the viewing mode to prevent the printing mechanism from operating.

As can be seen from the above description, each of the elements utilized and which form the reader-printer has been designed and located to provide a compact unit in front of which the user can comfortably sit and read the enlarged microform on the viewing screen and also print out the desired portion of the microform that he prefers to record. The unit is built so that persons of many age groups having a wide range of heights can use the reader-printer comfortably in a normal sitting position. Furthermore, the device takes up a minimal amount of room and can be located flush against a wall, the only requirement being that the front and upper surface of the device be unobscured.

What I claim is:

1. An improved epidiascopic combination reader-printer for enlarging, projecting and printing microform images comprising, a floor standing housing having generally an upper surface, a front surface, a rear surface and opposing side surfaces, the front surface including a forwardly projecting cantilevered portion extending downwardly from the upper surface at an angle to a horizontal plane of approximately 25°—35°, the cantilevered portion having a lower wall configured to accommodate the knee and leg portion of a person seated on a chair of standard height, a rear projection viewing screen mounted on the cantilevered portion of the front surface, the midpoint of the viewing screen being approximately 30—36 inches above the floor, a microform holder and transport means mounted on the upper surface adjacent to the front surface, the holder and transport means being located less than approximately 24 inches from the forwardmost portion of the cantilevered portion measured along a horizontal line, microform illumination means, a printing station within the housing, means for positioning a photosensitive medium at the printing station, an optical system for projecting an image of a microform in the holder and transport means, said optical system including a first projection path including an odd number of reflecting surfaces to project the image to the printing station, said optical system including a second projection path of the same length as the first path for projecting said image to the viewing screen, the second projection path having an even number of reflecting surfaces including a stationary reflecting surface fixedly mounted within said cantilevered portion of the front surface and a movable reflecting surface mounted within the housing, means for moving the movable reflecting surface from a. a first position wherein the movable reflecting surface is out of optical alignment with the optical system permitting light from the illuminated microform to be transmitted along the first projection path to the printing station, while excluding ambient light, to b. a second position wherein the movable reflecting surface transmits light from the illumination means along the second projection path to the stationary reflecting surface and prevents said light from being transmitted to the printing station, the relative alignment of the stationary reflecting surface and the movable reflecting surface when in the second position effecting transmission of light from the illuminated microform to the viewing screen, means within the housing for developing a print of the image received on the photosensitive medium, print delivery means accessible from one of said housing surfaces, and means for transporting the photosensitive medium from the printing station through the developing means and to the print delivery means.

2. A reader-printer as defined in claim 1 where the upper surface of the housing has a first aperture vertically therethrough, the holder and transport means has a second aperture therethrough aligned with the first aperture, the microform illumination means includes a. first lighting means mounted above the microform holder and transport means for transmitting light through transparent microforms, b. second lighting means mounted below the first and second apertures for illuminating opaque microforms, c. selection means for selectively energizing the first or second lighting means.

3. A reader-printer as defined in claim 2 wherein the first lighting means is enclosed within a light housing mounted on the upper surface and above the holder and transport means and wherein the selection means is mounted on the front wall of the light housing, the light housing being within the normal reach of a person seated in front of the device.

4. A reader-printer as defined in claim 3 wherein the print delivery means is accessible through the front surface of the housing and wherein the height of the upper surface of the housing is approximately 32—40 inches above the floor.

5. A reader-printer as defined in claim 4 wherein the printing station is mounted adjacent to the rear surface and the means for developing the photosensitive medium is located forwardly of rear surface of the housing.